United States Patent
Pressnell

(10) Patent No.: US 11,701,533 B2
(45) Date of Patent: Jul. 18, 2023

(54) SPRINKLER HEAD ADAPTER

(71) Applicant: Tyco Fire Products LP, Lansdale, PA (US)

(72) Inventor: Kevin W. Pressnell, Athens, AL (US)

(73) Assignee: Tyco Fire Products LP, Cranston, RI (US)

( * ) Notice: Subject to any disclaimer, the term of this patent is extended or adjusted under 35 U.S.C. 154(b) by 1255 days.

(21) Appl. No.: 16/308,260

(22) PCT Filed: Jun. 8, 2017

(86) PCT No.: PCT/US2017/036584
§ 371 (c)(1),
(2) Date: Dec. 7, 2018

(87) PCT Pub. No.: WO2017/214418
PCT Pub. Date: Dec. 14, 2017

(65) Prior Publication Data
US 2019/0175968 A1    Jun. 13, 2019

Related U.S. Application Data

(60) Provisional application No. 62/348,624, filed on Jun. 10, 2016.

(51) Int. Cl.
*A62C 35/68* (2006.01)
*F16L 47/06* (2006.01)

(52) U.S. Cl.
CPC .............. *A62C 35/68* (2013.01); *F16L 47/06* (2013.01)

(58) Field of Classification Search
CPC .......... A62C 35/68; F16L 47/24; F16L 47/16; Y10S 285/91; Y10S 285/918; Y10S 277/91
See application file for complete search history.

(56) References Cited

U.S. PATENT DOCUMENTS

| 3,100,656 | A |   | 8/1963  | Macarthur |           |
|-----------|---|---|---------|-----------|-----------|
| 4,296,954 | A |   | 10/1981 | Fujimaki et al. |     |
| 4,570,983 | A | * | 2/1986  | Olenfalk  | F16L 41/086 |
|           |   |   |         |           | 285/212   |
| 5,437,481 | A |   | 8/1995  | Spears et al. |       |
| 5,951,058 | A | * | 9/1999  | Dickinson | B29C 66/52296 |
|           |   |   |         |           | 285/21.2  |

(Continued)

FOREIGN PATENT DOCUMENTS

AU    2015203870 A1    7/2015

OTHER PUBLICATIONS

International Search Report and Written Opinion for International Application No. PCT/US2017/036584, dated Jul. 26, 2017, 18 pages.

*Primary Examiner* — Tuongminh N Pham
(74) *Attorney, Agent, or Firm* — Foley & Lardner LLP

(57) ABSTRACT

A two member plastic pipe fitting adapter for installing a threaded sprinkler head. The members are coupled together to form a chamber for housing an annular gasket. The gasket chamber includes an expansion void and bearing surfaces for the gasket. The adapter includes a receptacle with an internal thread for engagement with a sprinkler head to load the gasket and form a fluid tight seal. The engagement between the sprinkler and the adapter is formed by dissimilar threads to minimize the outward radial forces on the adapter.

15 Claims, 4 Drawing Sheets

(56) References Cited

U.S. PATENT DOCUMENTS

| | | | |
|---|---|---|---|
| 7,017,951 B2 | 3/2006 | Spears | |
| 8,297,663 B2 | 10/2012 | Spears | |
| 2008/0012327 A1* | 1/2008 | Spears | F16L 15/08 285/355 |
| 2011/0214886 A1* | 9/2011 | Orr | A62C 35/68 285/321 |
| 2016/0123507 A1* | 5/2016 | Spears | F16L 47/16 29/428 |

* cited by examiner

SPRINKLER HEAD ADAPTER

PRIORITY

The present application is a National Stage Application of PCT/US2017/036584, filed Jun. 8, 2017, which claims the benefit of and priority to U.S. Provisional Patent Application No. 62/348,624, filed Jun. 10, 2016, both of which are incorporated herein by reference in their entireties.

BACKGROUND OF THE INVENTION

Pipe fittings used in the installation of fire protection sprinklers are well known. Generally, fire protection sprinklers or sprinkler heads include a sprinkler frame body with an inlet end having an external pipe thread for forming a threaded pipe connection with a supply pipe of firefighting fluid, such as for example, water and an outlet end for discharging the fluid to address a fire. The pipe thread on most sprinklers are tapered pipe threads in accordance with an accepted pipe thread standard such as, for example, National Pipe Thread Taper (NPT)-ANSI/ASME B1.20.1, "Pipe Threads, General Purpose, Inch." For proper sprinkler installation, it is necessary for the sprinkler and its external pipe thread to form a fluid tight seal. Moreover, for many sprinklers, the sprinkler must be properly oriented with respect to the supply piping. Many fire protection sprinklers include operational components which distribute the firefighting fluid. These components includes a deflector member that is spaced from the outlet of the sprinkler body to distribute the firefighting fluid in a spray pattern based upon the fluid discharge from the outlet. The deflector member may be supported by frame arms formed integrally with the sprinkler frame body. In order for the sprinkler to distribute the water in a desired manner, it is often necessary to orient the deflector member and/or the frame arms with respect to the supply pipe. One problem that may arise in orienting the sprinkler into position is that it can compromise the fluid tight engagement at the sprinkler thread connection. The sprinkler may be over-torqued, which can damage the sprinkler threads or the sprinkler and thereby compromise the fluid tight connection. Alternatively, the sprinkler can be under-torqued which can result in an improper seal at the threaded connection.

Prior sprinkler fittings have been described to address these problems. For example, U.S. Pat. No. 8,297,663 describes a fire sprinkler fitting to install a fire protection sprinkler. The described fitting includes an open end upstream end through which fluid can flow to a downstream end having an internal thread for receiving a fire sprinkler. The internal thread is described as NPT thread conforming to ASTM standard F1498 with "the pitch diameter is at the end to oversize." The U.S. Pat. No. 8,297,663 Patent describes that in operation, the sprinkler can be rotated for up to 360° into its proper installed orientation after forming a fluid tight seal. To form the fluid tight seal, the sprinkler end engages and compresses a gasket within an internal "gasket retention area" of the fitting having a "flat gasket retention area base surface" upstream of the internal threads. According to the patent and its figures, the sprinkler compresses the gasket "so as to laterally distort the gasket inwardly." It is believed that this distortion alters the flow characteristics through the fitting from the uncompressed to the compressed state of the gasket. This alteration in flow characteristics can negatively impact the expected flow and spray pattern characteristics from the sprinkler.

U.S. Pat. No. 8,297,663 describes that the sprinkler fitting can be constructed from a cross-linked polyethylene material; and U.S. Pat. No. 5,437,481 describes another sprinkler fitting in the form of a coupling made from polyvinyl chloride (PVC) or chlorinated polyvinyl chloride (CPVC). In the Background Section of U.S. Pat. No. 5,437,481, a problem is described with pipe fitting made of plastic and in particular, internal or female plastic threaded fittings. These plastic fitting experienced failure when metal threaded elements are threaded into the plastic female threaded fitting when excessive torque is applied. To address this problem, U.S. Pat. No. 5,437,481 describes a coupling having a metal connection portion in which a metallic internally threaded insert is disposed and disposed about the metal connection portion is a reinforcing collar. Other examples of fittings with metal reinforcements are described in U.S. Pat. No. 8,297,663 in which polyethylene fitting include metallic thread inserts and in U.S. Pat. No. 7,017,951 in which a PVC or CPVC pipe fitting includes a compression band disposed over an internally threaded attachment end of the pipe fitting.

DISCLOSURE OF INVENTION

There remains a need for a plastic sprinkler fitting that can form a sealed threaded engagement with a metal fire protection sprinkler without a metal insert or other reinforcement structure. Preferred embodiments of a sprinkler head adapter or sprinkler adapter and methods of assembly are provided for coupling a fire protection sprinkler to a firefighting fluid supply pipe. The preferred adapter includes a receptacle with an internal thread for engaging the fire protection sprinkler and a gasket chamber for housing a gasket to form a fluid tight seal with the sprinkler without negatively affecting the fluid flow characteristics of the sprinkler.

A preferred sprinkler adapter includes a housing having a first end for connection to a firefighting fluid supply pipe, a second end including an internal passageway extending from the first end to the second end. The internal passageway including a receptacle formed at the second end with an internal preferably straight pipe thread for a threaded engagement with a fire protection sprinkler. The internal passageway also preferably includes a gasket chamber between the first end and the internal straight thread. A gasket is disposed in the chamber with a central opening defining an area through which fluid can flow. The gasket chamber has a holding portion and an expansion portion. The holding portion defines a first volume in which the gasket is completely housed in an unloaded state of the gasket, and the expansion portion defines a preferred second volume or pocket for a displaced portion of the gasket in a loaded state of the gasket defined by the threaded engagement between the sprinkler and the internal thread. The housing is preferably constructed and configured as a self-supporting monolithic plastic about the internal thread of the receptacle to eliminate any need for a reinforcing collar, insert or other reinforcement structure.

In another preferred embodiment, a sprinkler adapter preferably includes a body having a first end portion, a second end portion with a through hole extending from the first end portion to the second end portion along a first central axis. The second end portion has an external thread with an enlarging bore defining a bottom surface formed about the through hole. The adapter also includes a cap having a first end portion, a second end portion, with a through hole extending from the first end portion to the second end portion along a second central axis. The first end portion of the cap has an enlarging bore with a bottom surface formed about the through bore of the cap and an internal thread that is engaged with the external thread of the body. The cap is coupled to the body to coaxially align the first and second central axes such that the bottom surface of the body is opposed to and spaced from the bottom surface of the cap to define bearing surfaces of a preferred gasket chamber. An annular gasket is disposed within the gasket chamber. The bottom surface of the cap is planar and perpendicular with respect to the coaxial axes to support the gasket and the bottom surface of the body includes a skewed portion that is skewed with respect to the bottom surface of the cap.

A method of coupling a sprinkler to a fluid supply pipe is also provided. The method includes coupling a plastic adapter to the fluid supply pipe and placing a sprinkler into contact with a first surface of an annular gasket housed in an initially unloaded state within an internal gasket chamber of the plastic adapter. The method further includes threading the sprinkler within the adapter to place the gasket in a loaded state with a second surface of the gasket against a bearing surface of the gasket chamber to form a fluid tight seal with an internal diameter or open area of the annular gasket being the same in the loaded state as in the unloaded state.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Figure 1:
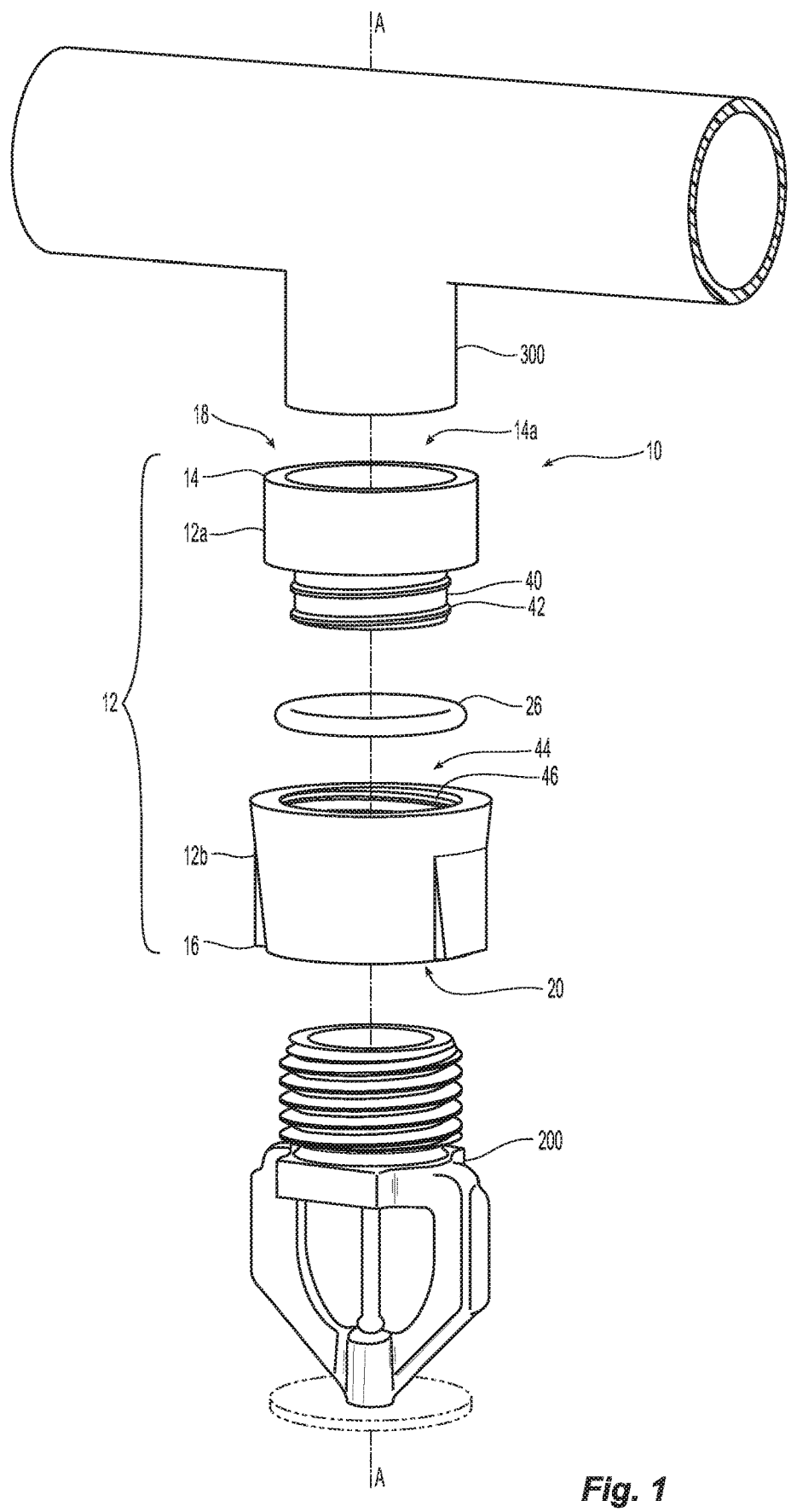
FIG. 1 is an exploded perspective view of a preferred sprinkler adapter assembly.
Figures 2A, 2B:
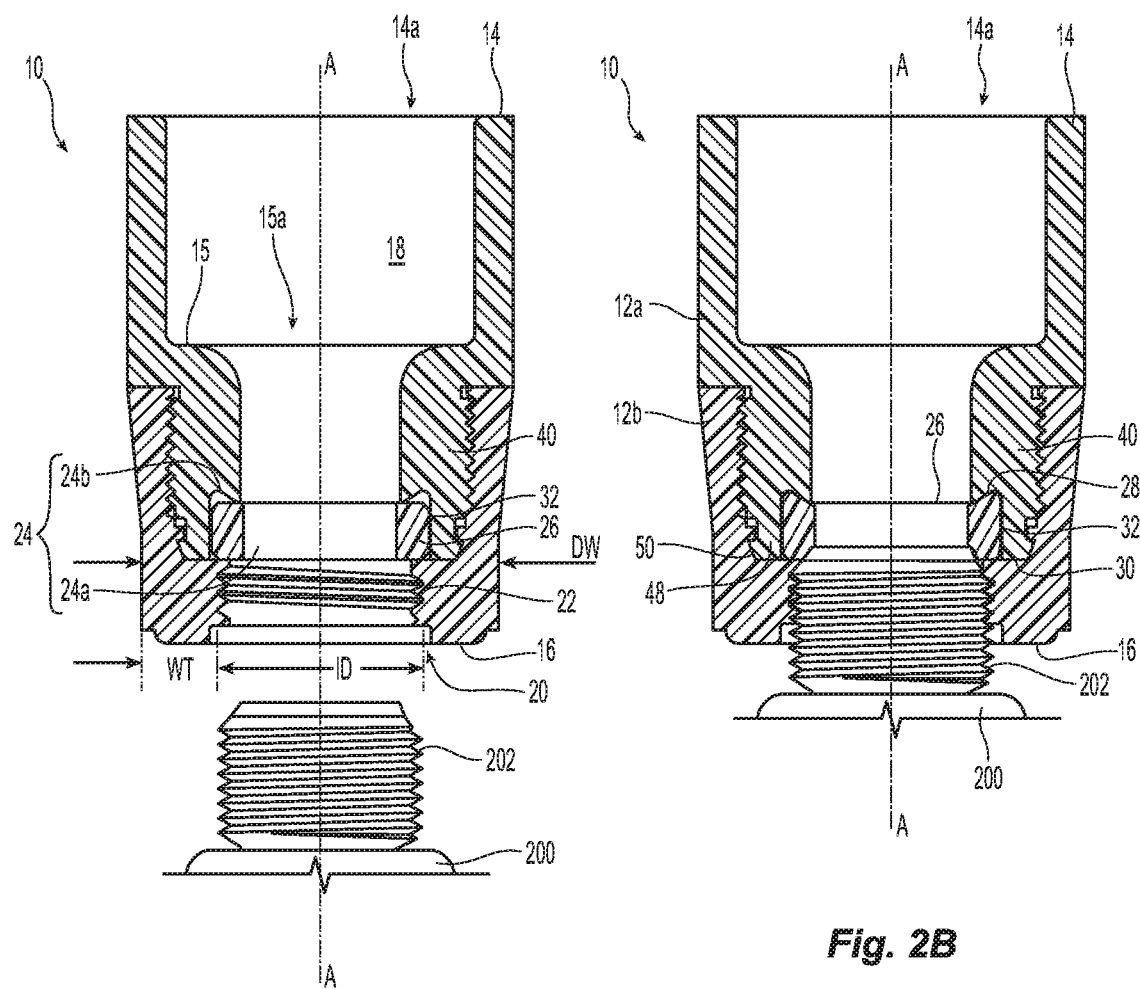
FIG. 2A is a cross-sectional view of the preferred sprinkler adapter in the assembly of FIG. 1 with a gasket in an unloaded state.
FIG. 2B is a cross-sectional view of the preferred sprinkler adapter in the assembly of FIG. 1 with a gasket in a loaded state.
Figure 4A:
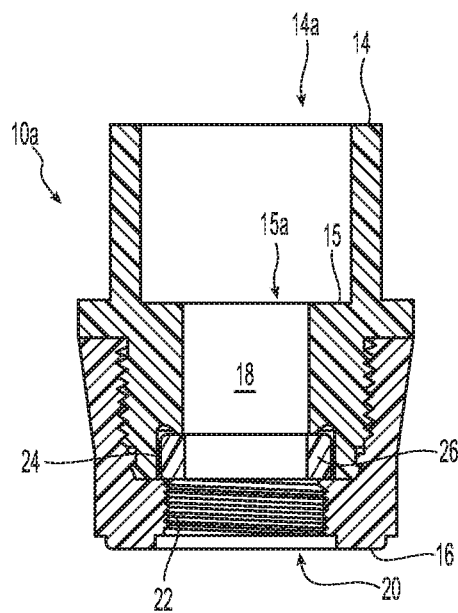
FIGS. 4A-4D are cross-sectional views of alternate embodiments of a sprinkler adapter for use in the assembly of FIG. 1.

Shown in FIG. 1 is an exploded perspective view of a an assembly having a preferred embodiment of a sprinkler adapter 10 for coupling a fire protection sprinkler 200 to a fluid supply line or pipe fitting 300. Generally, the adapter 10 includes a housing 12 having a first end 14 and inlet 14a for connection to the firefighting fluid supply pipe fitting 300 and a second end 16 for connection to the fire protection sprinkler 200. The first end 14 can be formed as either a female connector as shown, or a male connector 10a, as shown in FIG. 4A, for connecting the adapter 10 to the fluid supply piping 300. Referring to FIG. 2A, the housing 12 is a substantially tubular member with an internal passageway 18 extending from the first end 14 to the second end 16 along a central axis A-A. As shown, the adapter 10 is a straight fitting and can be additionally formed as a reducer fitting. Alternatively, the adapter 10 can be formed as an elbow fitting 10b as seen, for example, in FIG. 4B. The internal passageway 18 includes a receptacle 20 formed at the second end 16 with an internal thread 22 for a threaded engagement with the fire protection sprinkler 200. In use, firefighting fluid flows from the inlet 14a at the first end 14 through the receptacle 20 at the second end 16 and to the inlet of the sprinkler 200. The housing 12 is preferably formed from a plastic material, for example molded BLAZEMASTER® CPVC material from Lubrizol Corporation of Wickliffe, Ohio, and constructed to be self-supporting in its engagement with the fire protection sprinkler. The piping 300 is also preferably of a similar thermoplastic material. As used herein, "self-supporting" means that the housing 12 or its operative portion fully forms a coupled engagement with the sprinkler 200 without a separate support or other component such as, for example, an external metal collar, internal metal insert or other reinforcements structure to resist outward radial tension along the engagement between the sprinkler 200 and the internal thread 22 of the housing. Accordingly, the preferred self-supporting housing 12 is preferably a monolithic plastic about the internal thread 22 from the internal thread to the outer surface of the housing 12.

The housing 12 and its internal passageway 18 includes a gasket chamber 24 preferably located between the first end 14 and the internal thread 22. The gasket chamber 24 and the receptacle 20 are preferably aligned with one another and centered about the central axis A-A. A gasket 26 is disposed in the gasket chamber 24. The gasket 26 is preferably an annular member having a central opening or hole through which fluid delivered to the first end 14 can flow. The gasket 26 has an unloaded state and a loaded state within the gasket chamber 24. More specifically, without a sprinkler 200 in the receptacle 20 or fully engaged in the receptacle 20, the gasket 26 is in its unloaded state in which the gasket is merely housed within the chamber. In the loaded state, the gasket 26 forms a fluid tight seal with the sprinkler 200 that is advanced into the receptacle 20 to press the gasket 26 against bearing surfaces of the gasket chamber 24. In addition to providing a fluid tight seal between the gasket 26 and the sprinkler 200, the loaded interaction between gasket chamber 24 and gasket 26 substantially maintains the discharge and/or rated flow characteristics of the sprinkler 200 as rated by the nominal K-factor of the sprinkler. "K-factor" is a discharge coefficient defined as an average flow of water in gallons per minute through the internal passageway divided by a square root of pressure of water fed into the inlet end of the internal passageway in pounds per square inch gauge: $Q=K\sqrt{P}$ where P represents the pressure of water fed into the inlet end of the internal passageway through the body of the sprinkler, in pounds per square inch gauge (psig); Q represents the flow of water from the outlet end of the internal passageway through the body of the sprinkler, in gallons per minute (gpm); and K represents the nominal K-factor constant in units of gallons per minute divided by the square root of pressure expressed in psig.

Referring to FIGS. 2A and 2B, the receptacle 20 formed at the second end 16 of the housing 12 is preferably formed with an internal straight thread 22. Generally, the external thread 202 of the sprinkler 200 is of a tapered form, for example, NPT thread. By using female or internal straight threads 22 for receipt of the male or external tapered sprinkler thread 202 of the sprinkler 200, a proper fluid tight seal can be formed upon a preferably squared contact between the sprinkler 200 and the gasket 26. Moreover, the straight threads 22 of the adapter facilitate the self-supporting engagement with the sprinkler 200. Because the female straight thread 22 does not correspondingly taper with the tapering thread 202 of the sprinkler 200, the dissimilar threaded engagement between the two is limited and does not generate the same outward radial forces as is generated in complimentary engaged tapered threads. Thus, the adapter 10 does not need any additional reinforcement in or about the housing, such as for example, a metal reinforcement insert or an metal collar disposed about the second end 16 of the housing.

In addition to the preferred internal straight thread formation 22 of the receptacle 20, the housing 12 includes a preferred minimum wall thickness WT at the second end 16 of the housing to facilitate the self-supporting function of the adapter. In a preferred embodiment, where the internal thread 22 defines an internal diameter ID of ½ inch (0.5 in.), the second end 16 of the housing 12 defines a preferred minimum width or diameter DW that ranges from 1.4-1.5 inches to define a preferred wall thickness of 0.45-0.5 in. Accordingly, a preferred ratio of housing width-to-receptacle internal diameter (DW:ID) along the receptacle 20 ranges from 2.8:1 to 3:1. The internal diameter ID of the internal straight thread 22 can be defined by any one of the pitch diameter, minor diameter or major diameter of the internal thread 22 provided the straight thread engages the tapered thread of the sprinkler 200. The internal straight thread can be for example, ½-14 NPS Thread. Although the preferred straight-to-tapered thread engagement with the sprinkler 200 is limited, use of the preferred straight internal thread 22 permits the sprinkler 200 to be infinitely rotatable about the axis A-A within the receptacle 20 while fully loading the gasket 26. Accordingly, the sprinkler 200 can be rotationally oriented in any desired position to correspondingly orient its deflector or other deflecting structure to effect proper or desired fluid distribution from the sprinkler 200 over the area being protected while maintaining a fluid tight seal with the internally disposed gasket 26. To further facilitate the engagement between the adapter 10 and the sprinkler 200, the outer or external surface of the adapter 10 of the receptacle 20 includes a tool engagement surface formed radially about the internal thread 22 for engaging a wrench or other tool for threading about the sprinkler 200. Given the self-supporting structure of the adapter, the adapter is unitarily plastic in the radial direction from the internal thread 22 to the tool engagement surface.

Respectively shown in FIGS. 2A and 2B is the adapter 10 with the gasket 26 in the unloaded and loaded states. Referring specifically to FIG. 2A, the gasket chamber 24 generally has two regions: (i) a holding portion 24a and (ii) an expansion portion 24b. The holding portion 24a preferably defines a first volume in which the gasket is completely housed in the unloaded state of the gasket 26. Preferably, the volume defined by the holding portion 24a is substantially cylindrical for holding the annular shaped gasket 26. The expansion portion 24b of the gasket chamber 24, defines a second volume for housing a displaced portion of the gasket 26 in the loaded state of the gasket 26. The expansion portion 24b preferably defines an annular void or gap located above or axially adjacent the unloaded gasket 26 for receipt of the displaced gasket portion in a loaded state of the gasket 26.

Figure 3:
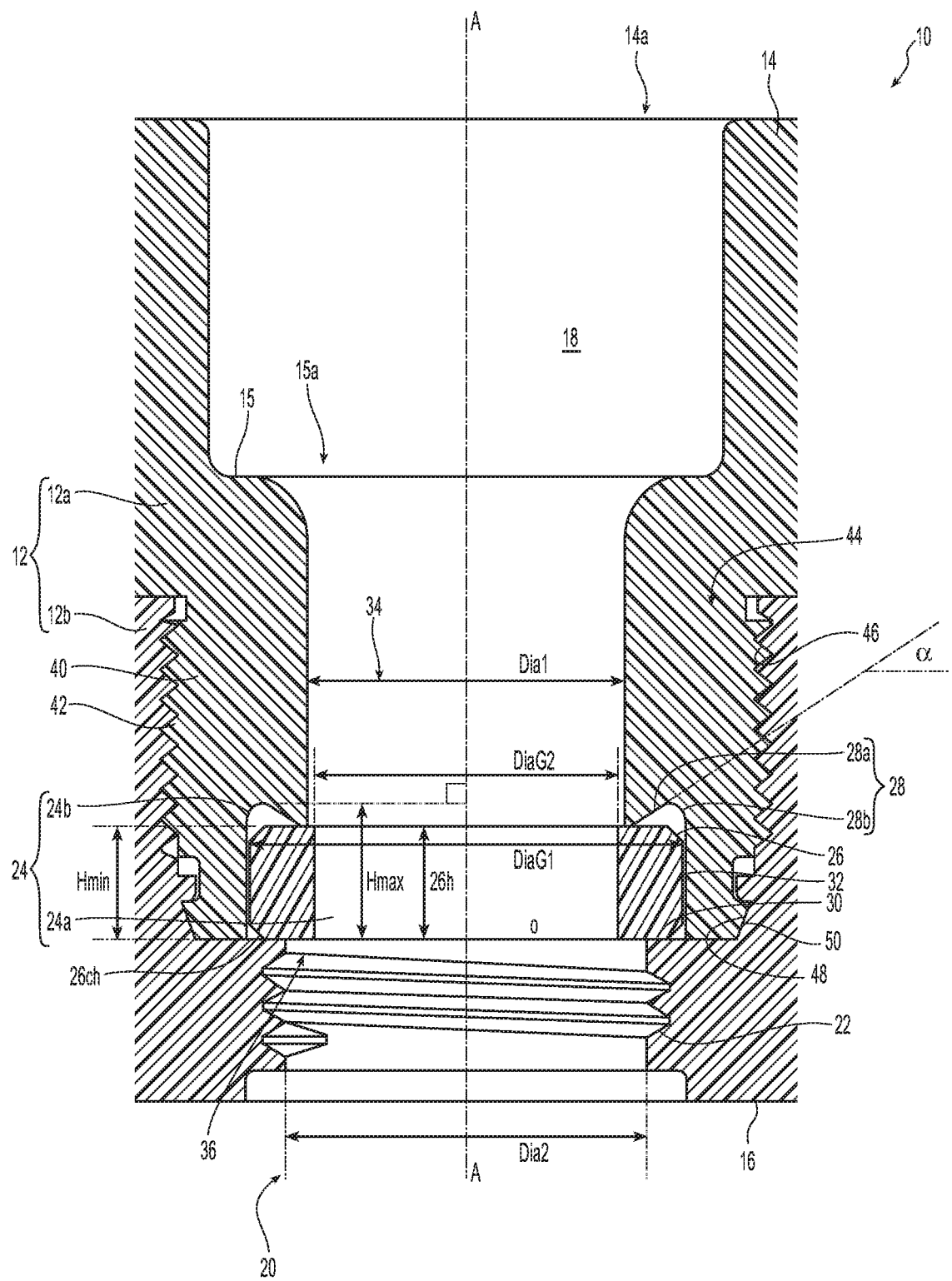
FIG. 3 is detailed cross-sectional view of a preferred sprinkler adapter for use in the assembly of FIG. 1

As seen in the cross-sectional view of FIG. 3, the expansion portion 24b is more preferably defined as a triangular or wedged-shaped void circumscribed about the central axis A-A. The gasket chamber 24 and its portions 24a, 24b is defined by various gasket bearing surfaces. The housing 12 and its gasket chamber 24 includes a first gasket bearing surface 28, a second gasket bearing surface 30 spaced from the first bearing surface and an internal wall 32 extending between the first and second bearing surfaces 28, 30. The second gasket bearing surface 30 is preferably a planar surface extending perpendicular to the central axis A-A. The second gasket bearing surface 30 also provides for a base surface upon which the gasket 26 can rest in its unloaded state. More specifically, with the housing 12 disposed with its central axis A-A in a vertical orientation, the gasket 26 rests upon the second gasket bearing surface 30 in the absence of a sprinkler 200 to load the gasket. In cross-section, the first gasket bearing surface 28 preferably includes a skewed portion 28a that is skewed with respect to the central axis A-A and a curved or radiused transition or portion 28b formed between the skewed portion 28a and the internal wall 32. Accordingly, in the cross-sectional elevation views of the gasket chamber shown in FIG. 3, the gasket chamber 24 is preferably non-polygonal. In a preferred embodiment, the skewed portion 28a, defines an included angle α with a line perpendicular to the central axis A-A to deform and bear against the gasket 26 in a preferred manner as described herein. In a preferred embodiment, the included angle α measures twenty degrees (20°) or more and is more preferably 30° or more but can define alternate angles provided that the gasket is deformed and acted upon in a manner as described herein. The internal wall 32 preferably extends parallel to the central axis A-A to define a preferably constant width of the chamber 24. More preferably, where the internal wall 32 is circumscribed about the central axis A-A, the internal wall defines a preferably constant diameter annular sidewall of the gasket chamber 24.

The first gasket bearing surface 28 is spaced from the second gasket bearing surface 30 to define the height or depth of the gasket chamber 24. With the first gasket bearing surface 28 having a skewed portion 28a, the height of the gasket chamber 24 varies in the radial outward direction from the central axis A-A. At its maximum height, the gasket chamber 24 defines a preferred wall height-to-gasket height or thickness ratio that ranges from 1.2:1 to 1.25:1. For example, for a preferred gasket 26 having a thickness or height 26h ranging from 0.225-0.275 inch, the gasket chamber 24 defines a preferred maximum height of 0.275 inch at the internal wall 32. Accordingly, a preferred gasket height 26h in an unloaded state has a maximum height range that is equal to or less than the maximum height of the chamber 24. A preferred radiused portion 28b of the first bearing surface 28 defines a tangent perpendicular to the central axis A-A to define the maximum axial distance or height HMax from the second gasket bearing surface 30 and more preferably measures of 0.275 inches.

With the gasket chamber 24 being centered about the central passageway 18, each of the first and second gasket bearing surfaces 28, 30 define a central opening 34, 36 sized to maintain the gasket 26 within the chamber 24 and permit a flow through the housing 12 to maintain the discharge characteristics of the sprinkler 200 in a loaded state of the gasket. Each of the central openings 34, 36 respectively defined by the first and second gasket bearing surfaces 28, 30 is smaller than the outer diameter DiaG1 of the gasket 26 disposed in the chamber 24. The central openings 34, 36 of the first and second gasket bearing surfaces 28, 30 are axially spaced apart and aligned to define the minimum axial distance therebetween and the minimum height of the gasket chamber 24 and is preferably equivalent to the height or thickness of the gasket 26 disposed therein. With the preferred gasket 26 having a central hole 26o and more preferably a circular central hole 26o having an inner diameter DiaG2, the central opening 34 defined by the first gasket bearing surface 28 has a preferred diameter Dia1 that is preferably greater than the inner diameter DiaG2 of the gasket 26. The second bearing gasket surface 30 defines a central opening 36 having a preferred diameter Dia2 that is also preferably greater than the inner diameter DiaG2 of the gasket 26 and more preferably also greater than the inner diameter Dia1 of the central opening of the first gasket bearing surface 28. The central opening 36 of the second gasket bearing surface 30 is the opening through which a sprinkler 200 engaged with the internal threads can extend to load the gasket 26. Accordingly, the preferred diameter Dia2 of the central opening 36 can be, at a minimum, equivalent to the nominal internal diameter ID of the internal thread 22 for receipt of the sprinkler 200.

Referring to FIG. 2B, the sprinkler 200 loads the gasket 26 and forms a fluid tight seal upon being fully received by or engaged with the internal threads 22 of the receptacle 20. The formed seal is preferably a fluid tight seal sufficient to withstand a maximum pressure of 2300 psi delivered to the inlet 14a of the assembly. More particularly for the threaded engagement between the adapter 10 and the sprinkler 200, the engagement in combination with the gasket 26 defines a preferred burst pressure ranging between 1000 psi-2300 psi. As shown in FIG. 2B, the axially loaded gasket 26 bears against the skewed portion 28a of the first bearing surface 28. The gasket 26 deforms and fills the expansion portion 24b of the gasket chamber 24. Because of the preferred configuration of the expansion portion 24b, any deformation in the gasket 26 remains out of the fluid flow path of the adapter. More preferably, the central hole or opening 26o of the gasket 26 maintains its geometry or area constant from the loaded state to the loaded state without inward distortion under loading so as not to reduce the flow characteristics of the assembly. Thus, where the central opening of the gasket 26 is circular, the inner diameter DiaG2 of the gasket 26 remains constant from the unloaded state to the loaded state. Thus, despite the loading on the gasket 26, the assembled adapter 10 and sprinkler 200 maintains the rated flow characteristics of the sprinkler 200 as rated by the nominal K-factor of the sprinkler.

In one preferred embodiment, the housing 12 and gasket chamber 24 are sized for housing an annular circular gasket 26 having an outer diameter of DiaG1 of 0.875 in. and an inner diameter DiaG2 0.635 in. with a gasket height of 0.225 in. with a gasket height 26h preferably ranging from 0.225-0.275 inch. The gasket 26 preferably includes a chamfer 26ch along the upper and lower outer edges of each of the gasket 26 preferably specified as 0.02 in.×45°. The internal wall 32 of the chamber 24 defines a preferred internal diameter of 0.9 inches. The central openings 34, 36 of the first and second gasket bearing surfaces 28, 30 define respective diameters Dia1, Dia2 preferably range between 0.63 in. to 0.85 in and are preferably about 0.65 inch. More preferably, the central opening 36 of the second gasket bearing surface 30 is greater than the central opening 34 of the first gasket bearing surface 28. The maximum height Hmax of the gasket chamber 24 is preferably 0.275 inches and the minimum height Hmin of the gasket chamber is 0.225. The minimum height Hmin of the chamber 24 is preferably defined by the axial distance between the central openings 34, 36 of the first and second gasket bearing surfaces 28, 30. A preferred gasket 26 for use in the assembly has a preferred Durometer hardness ranging from 70 to 100 and more preferably ranges from 75-95 being more preferably one of 86 or 91 and is even more preferably 80. The gasket 26 is preferably made from a polyurethane material such as, for example, P5065A88 Low Temperature Polyurethane.

Figure 4C:
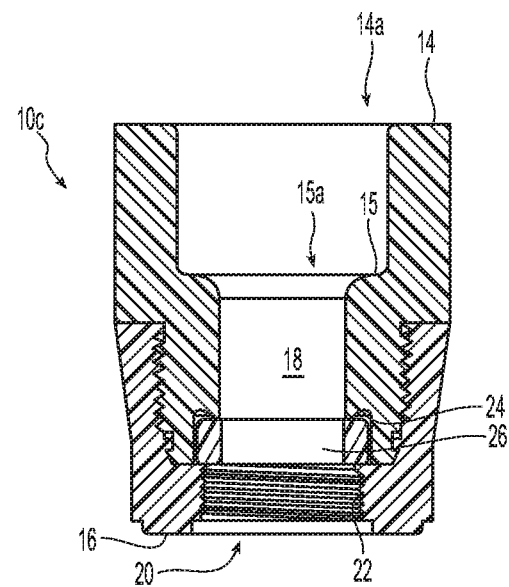
Figure 4B:
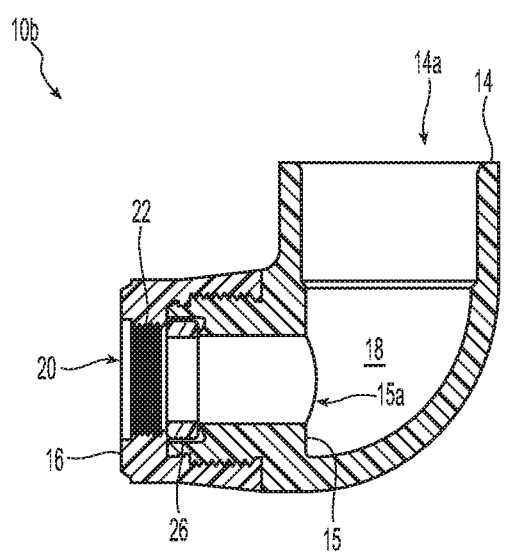
Figure 4D:
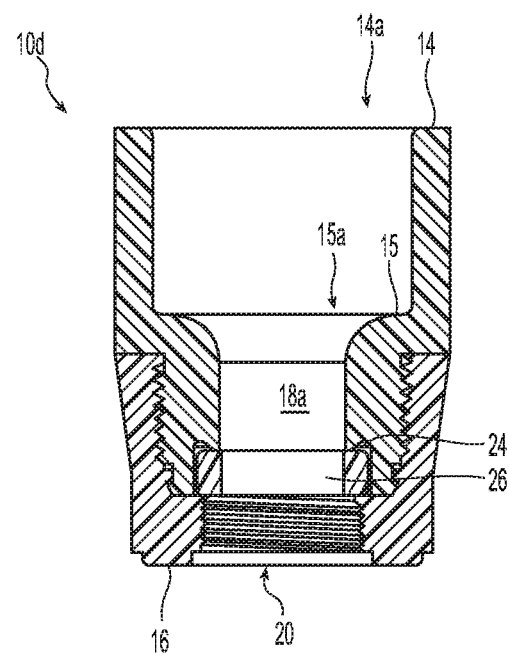

Referring again to FIG. 3, the inlet 14a of the internal passageway 18 is spaced from the gasket chamber 24 and centered along the central axis A-A. The inlet 14a has an inlet opening and an inlet floor 15 having a central opening 15a. The central opening 15a of the inlet floor defines an area perpendicular to the central axis A-A. The central opening 15a of the floor is smaller than the inlet opening such that the fluid passageway 18 decreases in the direction form the inlet to the gasket chamber 24. Shown in FIGS. 4C and 4D are alternate embodiments of the adapter 10c, 10d, in which the central opening 15a is sized and formed in any manner to reduce the passageway 18 from the inlet 14a to the gasket chamber 24. Moreover, the axial distance between the inlet floor opening 15a and the gasket chamber 24 can be varied to facilitate the connection to the fluid supply piping 300 and provide the desired fluid flow.

Referring again to FIG. 1, the adapter 10 and its housing 12 are preferably formed by the assembly of two components or members 12a, 12b. The first member 12a includes the first gasket bearing surface 28 and the second member 12b includes the second gasket bearing surface 30. The second member 12b is coupled to the first member 12a such that the first and second gasket bearing surfaces 28, 30 are axially spaced apart to form the gasket chamber 24 previously described. As shown, the first and second members 12a, 12b are preferably threaded together. In a preferred embodiment, one end of the first member 12a defines the first end 14 of the adapter 10 and includes the inlet 14a. At the opposite or second end portion of the first member 12a is a narrowed or stepped portion 40 having an external thread 42. The second member 12b includes a bore 44 for receiving the narrowed portion 40 of the first member 12a with the bore 44 including an internal thread 46 for engagement with the external thread 42 of the first member 12a. In a preferred embodiment, each of the external thread 42 of the first member 12a and the internal thread 46 of the bore 44 of the second member are Unified Screw Threads of UN thread form such as, for example, 1¼-16 UN-28 Thread. In one preferred aspect of the loaded state of the assembly 10 and gasket 26, the gasket bearing surfaces 28 and internal geometry of the chamber 24 define reaction forces directed axially along the threaded engagement between the external and internal threads 42, 46. The internal bore 44 of the second member is preferably coaxially aligned with the receptacle 20 such that the second gasket bearing surface 30 is between the bore 44 and the receptacle 20.

In another preferred aspect, the first and second members 12a, 12b additionally or alternatively include a snap-fit engagement. Referring to FIG. 3, the narrowed portion 40 of the first member 12a includes a projection 48 and the internal bore 44 includes a groove 50 for receipt of the projection 48. More preferably, an annular barb or projection 48 is formed distally of the external thread 42 and an internal annular groove 48 is formed at the bottom of the bore 44 distal of the second internal thread 46. The projection 48 can be continuous about the narrowed portion 40 or alternatively defined by two or more spaced apart barbs. The projection 48 and the groove 50 form a preferred snap fit for coupling and/or securing the first and second members 12a, 12b to one another. Accordingly, in one preferred aspect, the external and internal threads 42, 46 have thread lengths preferably ranging from 0.625-0.75 inch to locate the projection 48 and groove 50 for their snap-fit engagement. The groove and projection can be alternatively arranged where, for example, the projection includes an external groove and the internal bore includes an internal projection to form a snap fit.

In the preferred embodiment shown in FIGS. 2A and 2B, the first member 12a provides a body and the second member 12b provides a cap threaded about the body 12a. Each of the body 12a and the cap 12b have a first end portion and a second end portion with a through hole or passageway extending from the first end portion to the second end portion along respective central axes of the body 12a and cap 12b. Accordingly, each of the body 12a and cap 12b has an external surface and an internal surface. Preferably each component 12a, 12b is a monolithic plastic from the external surface to the internal surface without the need for any internal support or structure of a dissimilar material such as metal. Upon coupling the first end portion of the cap 12b to the second end portion of the body 12a, the respective central axes and passageways are coaxially aligned with one another to define the central passageway 18 of the adapter 10.

Referring again to FIG. 3, the first end portion of the body 12a includes a countersunk bore formed about the internal passageway of the body 12a to define the inlet 14a previously described. The countersunk bore has an axial depth to the floor 15 to define preferred a ratio to the total axial length of the internal passageway of the body 12a being about 0.4:1. The second end portion of the body 12a includes the narrowed portion 40 having the external thread 42. The axial length of the external thread 42 defines a preferred ratio of the total axial length of the body 12a to the axial length of the external thread being about 2.4:1. Within the narrowed portion 40 at the second end portion of the body 12a, a countersunk bore is formed about the central opening 34 to define the gasket bearing surfaces 28 of the gasket chamber 24 including the internal wall 32. The bottom of the countersunk bore forms the preferred angled and radiused surfaces 28a, 28b of the first gasket bearing surface 28 about the central opening 34 previously described.

The cap 12b includes the enlarged bore 44 with the internal thread 46 for engaging the externally threaded narrowed portion of the body 12a and/or locating surfaces relative to one another. The bore 44 of the cap 12b includes a bottom surface to define the preferably planar second gasket bearing surface 30 and central opening 36 previously described. The bottom of the countersunk bore of the body 12a is opposed and spaced relative to the bottom of the bore 44 of the cap 12b to define the gasket chamber 24 upon the cap 12b engagement with the body 12a. For the cap 12b, the bottom surface of the bore 44 separates the through hole or internal passageway of the cap 12b into two portions. The first portion of the internal passageway of the cap 12b defines a first axial length and the second portion defines a second axial length of the internal passageway with a preferred ratio of first axial length to second axial length being about 2:1. The preferred cap 12b provides for the self-supporting structure in the adapter engagement with the sprinkler 200. With reference to FIGS. 2A and 2B, the second end portion of the cap 12b defines an external diameter or width DW and the receptacle 20 formed therein defines a maximum internal diameter ID at the second end portion of the cap 12b. A preferred ratio of the external diameter DW-to-maximum internal diameter ID of the second portion of the cap is about 1.7:1 and more preferably 1.67:1.

The preferred embodiments of the sprinkler adapter provide preferred methods of coupling a fire protection sprinkler to a fluid supply pipe and more preferably a plastic fluid supply pipe. One preferred method includes coupling a preferred embodiment of a plastic adapter 10 to the fluid supply pipe, placing a sprinkler 200 into contact with a first surface of an annular gasket housed in an initially unloaded state within an internal gasket chamber 24 of the plastic adapter 10. The preferred gasket 26 has a central opening or through hole defining an internal diameter or area centered about the central axis of the adapter. The preferred method includes threading the sprinkler 200 within the adapter 10 to place the gasket 26 in a loaded state with a second surface of the gasket 26 against a bearing surface 28 of the gasket chamber to form a fluid tight seal with the internal diameter, central opening or area of the annular gasket being the substantially the same in the loaded state as in the unloaded state centered about the central axis.

Another preferred method couples a metal sprinkler to a firefighting fluid supply pipe and includes obtaining a preferred embodiment of a sprinkler adapter, for example, as any adapter previously described and providing the adapter for connection to the fluid supply pipe. The fluid supply pipe is preferably plastic. Obtaining the preferred sprinkler includes any one or more of acquiring, purchasing, or manufacturing and providing includes transferring, selling, or otherwise supplying.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A sprinkler adapter, comprising:
   a body, comprising:
      a first body end;
      a second body end; and
      a body hole extending through the body from the first body end to the second body end along a first axis, the second body end having a body surface formed about the body hole;
   a cap, comprising:
      a first cap end;
      a second cap end; and
      a cap hole extending from the first cap end to the second cap end along a second axis, the first cap end having a cap surface, the cap to couple with the body to coaxially align the first axis and the second axis such that the body surface is opposed to and spaced from the cap surface to define a gasket chamber, the gasket chamber comprising a first gasket bearing surface extending from the body surface, a second gasket bearing surface spaced from the first gasket bearing surface, and an internal wall extending between the first gasket bearing surface and the second gasket bearing surface, the first gasket bearing surface comprising a skewed portion extending radially outward from the body surface in a direction towards the first body end, the first gasket bearing surface comprising a curved or radiused portion extending from the skewed portion to the internal wall, the second cap end to couple with a sprinkler head; and
   a gasket disposed in the gasket chamber, the gasket comprising a first gasket surface to face the body surface and a second gasket surface to face the cap surface, the cap surface is perpendicular with respect to the second axis to support the gasket.

2. The sprinkler adapter of claim 1, comprising:
the gasket has an unloaded state and a loaded state in which the gasket moves into an expansion portion of the gasket chamber between the gasket and the skewed portion responsive to the sprinkler head engaging the gasket, the expansion portion defined by the skewed portion and the curved or radiused portion.

3. The sprinkler adapter of claim 1, comprising:
the skewed portion defines an included angle of at least twenty degrees with respect to the cap surface.

4. The sprinkler adapter of claim 1, comprising:
a height of the gasket chamber between the first gasket bearing surface and the second gasket bearing surface increases in a radially outward direction from the first axis along the skewed portion.

5. The sprinkler adapter of claim 1, comprising:
the body and the cap are made of plastic.

6. The sprinkler adapter of claim 1, comprising:
a ratio of a height of the gasket chamber to a height of the gasket is greater than or equal to 1.2:1 and less than or equal to 1.25:1.

7. The sprinkler adapter of claim 1, comprising:
the gasket includes a chamfer along an outer edge of the gasket.

8. The sprinkler adapter of claim 1, comprising:
the body and the cap define a snap fit engagement.

9. The sprinkler adapter of claim 1, comprising:
the gasket is made of polyurethane.

10. A sprinkler adapter, comprising:
a first member made of plastic, the first member comprising:
  a first end;
  a second end; and
  a first hole extending through the first member from the first end to the second end along a first axis, the second end having a first surface formed about the first hole;
a second member made of plastic, the second member comprising:
  a third end;
  a fourth end; and
  a second hole extending from the third end to the fourth end along a second axis, the third end having a second surface, the second member to couple with the first member such that the first surface is spaced from the second surface to define a gasket chamber, the gasket chamber comprising a first gasket bearing surface extending from the first surface, a second gasket bearing surface spaced from the first gasket bearing surface, and an internal wall extending between the first gasket bearing surface and the second gasket bearing surface, the first gasket bearing surface comprising a skewed portion extending radially outward from the first surface in a direction towards the first end, the first gasket bearing surface comprising a curved or radiused portion extending from the skewed portion to the internal wall, the fourth end to couple with a sprinkler; and
a gasket disposed in the gasket chamber, the gasket comprising a first gasket surface to face the first surface and a second gasket surface to face the second surface, the second member is disposed around a portion of the first member in which the gasket is disposed.

11. The sprinkler adapter of claim 10, comprising:
the gasket has an unloaded state and a loaded state in which the gasket moves into an expansion portion of the gasket chamber between the gasket and the first surface responsive to the sprinkler engaging the gasket, the expansion portion defined by the skewed portion and the curved or radiused portion.

12. The sprinkler adapter of claim 10, comprising:
the third end is radially outward from the gasket relative to the second axis.

13. The sprinkler adapter of claim 10, comprising:
a height of the gasket chamber between the first gasket bearing surface and the second gasket bearing surface increases in a radially outward direction from the first axis along the skewed portion.

14. The sprinkler adapter of claim 10, comprising:
the second end defines a cavity to receive the gasket.

15. The sprinkler adapter of claim 10, comprising:
the gasket includes a chamfer along an outer edge of the gasket.

* * * * *